United States Patent
Banke et al.

(10) Patent No.: US 12,410,386 B2
(45) Date of Patent: Sep. 9, 2025

(54) DEVICE AND METHOD FOR EXTRACTING VALUE ADDING CONTENTS FROM PLANT BASED CONTENT CARRIERS INTO A BREW LIQUID

(71) Applicant: Banke Process Solutions GmbH & Co. KG, Taufkirchen (DE)

(72) Inventors: Friedrich Banke, Markt Schwaben (DE); Michael Kohles, Freising (DE)

(73) Assignee: Banke GmbH, Taufkirchen (DE)

( * ) Notice: Subject to any disclaimer, the term of this patent is extended or adjusted under 35 U.S.C. 154(b) by 636 days.

(21) Appl. No.: 17/079,444

(22) Filed: Oct. 24, 2020

(65) Prior Publication Data

US 2021/0139821 A1 May 13, 2021

(30) Foreign Application Priority Data

Nov. 11, 2019 (DE) .......................... 102019130400.8

(51) Int. Cl.
C12C 3/08 (2006.01)
C12C 5/02 (2006.01)

(52) U.S. Cl.
CPC ................ *C12C 3/085* (2013.01); *C12C 3/08* (2013.01); *C12C 5/026* (2013.01)

(58) Field of Classification Search
CPC ........... C12C 7/287; C12C 5/026; C12C 3/08; C12C 11/11; C12C 3/085; C12C 3/12
See application file for complete search history.

(56) References Cited

FOREIGN PATENT DOCUMENTS

| DE | 813144 A | 9/1951 | | |
|---|---|---|---|---|
| DE | 102008063304 A1 | 7/2010 | | |
| DE | 102013101435 A1 | 8/2014 | | |
| DE | 102015103909 A1 | 9/2016 | | |
| DK | 2227535 A1 * | 9/2010 | .............. | C12C 3/12 |
| EP | 2500408 A1 | 9/2012 | | |
| EP | 3023485 | 5/2016 | | |
| JP | S5856838 A | 4/1983 | | |
| JP | S62249737 A | 10/1987 | | |
| JP | H01304930 A | 12/1989 | | |
| JP | H08103987 A | 4/1996 | | |
| WO | WO2009083205 A1 | 7/2009 | | |
| WO | WO2019015879 A1 | 1/2019 | | |

* cited by examiner

*Primary Examiner* — Vera Stulii
(74) *Attorney, Agent, or Firm* — Von Rohrscheidt Patents (57) ABSTRACT

A method for extracting value adding content substances from plant based content substance bearers into a brew liquid by bringing a predetermined amount of the plant based content substance bearers in contact with a predetermined volume of fresh brew liquid in a dispersion and extraction container so that the plant based content substance bearers are at least partially distributed or dissolved in the brew liquid by forming a first suspension and the value adding content substances transition from the plant based content substance bearers into the brew liquid and so that the plant based content substance bearers are separated from the brew liquid by gravity when performing a solid-liquid-separation.

11 Claims, 7 Drawing Sheets

DEVICE AND METHOD FOR EXTRACTING VALUE ADDING CONTENTS FROM PLANT BASED CONTENT CARRIERS INTO A BREW LIQUID

RELATED APPLICATIONS

This application claims priority from and incorporates by reference German Patent Application DE 10 2019 130 400.8 filed on Nov. 11, 2019.

FIELD OF THE INVENTION

The invention relates to a method for extracting value adding content substances from plant based content substance carriers into a brew liquid according to the preamble of patent claim 1 and preamble of patent claim 7. Value adding content substances are for example bitter substances, aromatic substances, e.g. etheric oils and polyphenols from plant based content substance bearers, e.g. plant based aroma bearers, in particular from solid hop products. The invention also relates to a device for performing the method. The invention also relates to a brewing arrangement including the device.

BACKGROUND OF THE INVENTION

The method according to the invention, the device according to the invention, and the brewing arrangement according to the invention are used in particular for adding aroma to a brew liquid when brewing beer, in particular in the hot portion when cooking wort as well as in the cold portion when extracting hop, e.g. for aroma hopping. Using the methods according to the invention is not limited to adding aroma to the brew liquid using hop or solid hop materials like e.g. hop pellets but also other plant based content substance bearers e.g. shells of citrus fruits or coffee are useable in the method according to the invention for adding aroma, wherein value adding content substances are transmitted from the content substance bearers into the brew liquid. The brewing process where the invention is useable is not limited for producing beer but can also include brewing other beverages, in particular alcohol free beverages. Subsequently the invention is described based on an embodiment for aroma enriching beer but the invention is not limited thereto.

During wort cooking, thus in a hot portion of a brewery typically bitter substances e.g. alpha acids or beta acids are transferred from the hop or from hop products like e.g. hop pellets into the wort, thus into the instant brew liquid. The bitter substances determine bitterness of the beer. But also aroma substances, e.g. etheric oils can already be transferred into the brew liquid in the hot portion as long as the aromatic substances are not evaporated easily. Bitter substances and aromatic substances in addition to polyphenols form the value adding content substances of a beer.

Over the last couple of years the market for beers with strong hop aroma has increased greatly. In order to achieve the strong hop aroma beers are increasingly being hopped in cold condition. Thus hop typically in the form of hop pellets or natural hop as a plant based aroma bearer that forms the content substance bearer is added to the beer in the cold portion of a brewery, advantageously after fermenting to the non aged and not yet matured young beer. This is designated as cold hopping.

Cold hopping is often performed while storing the young beer in a storage tank. After the cold hopping solid plant based aroma bearers that accumulate as a sediment at the base of the tank, e.g. the hop draft have to be separated from the brew liquid e.g. the beer or young beer by filtration or separation. Thus, the suspension that has formed in the storage tank is pumped into another storage tank by a filtration or separation device. Frequently the sediment is drained first which, however, causes a substantial loss of beer and aroma components.

The invention, however, as stated supra is not limited to cold hopping but can also be used in the hot portion of a brewery, e.g. in the sud house. In the hot portion of the brewery, isomerization of alpha adds to iso-alpha adds and beta acids to iso-beta acids takes place. This process is limited by the solubility of the alpha acids from the hop or the hop products. Processing in a separate process container according to the instant invention improves extraction and isomerization while reducing the solid load in the whirlpool.

Therefore the term value adding content substances does not only include aromatic substances e.g. etheric oils of the plant based aroma bearers that are transferred into the brew liquid in the cold portion, e.g. into the beer or young beer but also bitter substances e.g. alpha acids or beta acids that are transmitted into the brew liquid, e.g. into the wort in the hot portion.

EP 3 023 485 A1 discloses a device and a method for extracting content substances from plant based content substance bearers into a brew liquid using a floating bed extractor in order to generate a high concentration gradient in a small container. The limited process speed and the limited volume flow that can be used for extraction are definite disadvantages. By the same token a flushing of solid particles from the extracted brew liquid that is enriched with content substances cannot be assured which requires additional downstream filtration devices.

DE 813 144 A describes a method for hop filtration that represents a combination of filtration and sedimentation in the hot portion of a brewery.

WO 2019/015 879 A1 discloses a system and a method for extracting soluble flavor components from a solid flavor bearing material into a brew liquid using crossflow filtration. This filtration is complex since hop has a broad spectrum of particle sizes. Accordingly very high crossflow velocities have to be achieved in order to achieve a crossflow effect. Furthermore filter surfaces can clog very easily, in particular with yeast cells and/or trub particles. A recirculation method is described where hop products are dissolved in a process container using an extraction liquid wherein the extraction liquid with the hop products or the particles dissolving therefrom are run through an interior of a crossflow filter in a recirculation cycle. A filtrate outlet of the filter is closed during this dissolving cycle. A conduit for fresh extraction liquid that leads into the cycle is open during the cycle in order to add fresh extraction liquid until the process container is filled. Only when the hop products are dissolved so that a suspension of hop products and extraction liquid is achieved the inlet for the fresh extraction liquid is closed and the filtrate outlet remains closed. Subsequently the suspension continues to be recirculated in the recirculation cycle wherein the aroma components are extracted from the solids into the extraction liquid and the hop products are completely dissolved. Then the filtrate outlet as well as the inlet are opened for a supply of fresh extraction liquid while continuing recirculating the suspension. Thus, the liquid extracted from the filtrate outlet is replaced with fresh extraction liquid.

EP 2 500 408 A1 describes an arrangement and a method for introducing hop into a tank. This method has the disadvantage that hop or hop solid material have to be conveyed into the tank in order to provide effective substance exchange. Hop, however, can only be separated from tanks through complex procedures since the complete tank volume has to be subjected to a filtration or separation process. This is only possible by transferring the entire tank content through a filtration or separation device into an additional tank, however an additional empty tank has to be available for this process. This limits the fermenting and storage capacity of a brewery and the cleaning requirements are increased by the additional tank. Additionally hop particles can cause increased wear, defects, plugged, leakage, and contamination in larger tubing and valve nodes.

DE 10 2008 063 304 A1 illustrates and describes a method and a device for processing beer wherein a hop product is not introduced in one shot into the entire wort but fresh extraction agent is fed to the hop product continuously. Thus, a concentration gradient between the hop product and the supplied extraction agent is to be kept high continuously in order to achieve high efficiency of the extraction. In order to perform the extraction, an extraction container is used that is separate from the wort pan. Initially a suspension is produced that includes the extraction agent and the hop product, subsequently the suspension is subjected to a solid-liquid separation and thereafter the extraction agent that includes the aromatic substances is pulled out and new fresh extraction agent is fed to the remaining hop product for further mixing. After dissolving the hop products in the liquid extraction agent a complete sedimentation of the solids is performed in the generated suspension before pulling the extraction agent that includes the extracts, thus several discrete extraction processes are performed in a time sequence using the same extraction agent.

BRIEF SUMMARY OF THE INVENTION

Thus it is an object of the invention to provide a method and a device configured to transfer value adding content substances into a brew liquid without flushing out solid particles of the plant based content substance bearers or where the solid particles of the plant based content substance bearers are at least retained to a large extent.

The object is achieved by the method claims.

In a first embodiment of the method according to the invention for extracting value adding content substances from plant based content substance bearers into a brew liquid according to claim 1 a predetermined amount of plant based content substance bearers is brought in contact with a predetermined volume of fresh brew liquid in a dispersion and extraction container wherein the plant based content substance bearers are at least partially distributed or dissolved in the brew liquid forming a first suspension and wherein value adding content substances transfer from the plant based content substance bearers into the brew liquid and wherein the plant based content substance bearers are separated from the brew liquid by gravity in order to perform a solid-liquid-separation, the method comprising:
  a) draining the brew liquid enriched with the value adding content substances from a dispersion and extraction container after a first predetermined time period, wherein the plant based content substance bearers remain in the dispersion and extraction container;
  b) feeding additional fresh brew liquid into the dispersion and extraction container and producing a second suspension;
  c) draining the brew liquid that is infused with the value adding content substances from the dispersion and extraction container after an additional predetermined time period, wherein the plant based content substance bearers remain in the dispersion and extraction container.

According to the invention gravity induced precipitation is performed before step a) and advantageously before step c) in that the solid materials of the suspension sediment or float in the extraction container during a phase separation time period wherein the respective predetermined time period is predetermined by a time period required for forming a defined phase boundary.

A "defined phase boundary" is a separation between a low solids brew liquid volume portion that is included in a dispersion and extraction container and a high solids suspension volume portion that is included in the dispersion and extraction container.

During gravity induced precipitation the solids included in the suspension float upwards when they are lighter than the brew liquid and the cleared brew liquid settles there below or the solids that are included in the suspension that are heavier than the brew liquid sediment downward and the cleared brew liquid settles there above. Due to the density differential between the solid material and the liquid the solid particles consequently collect either in the lower portion of the dispersion and extraction container when the solid's density is greater than the liquid density, thus the solids sediment or the solids float up when the liquid density is greater than the solids density. In both cases a phase boundary forms as a boundary surface between the denser medium and the less dense medium under gravity impact upon the suspension.

When cleared brew liquid is arranged above or below the phase boundary in a portion of a drain opening for the cleared brew liquid, then draining the cleared brew liquid that is enriched by the value adding content substances is technically feasible so that a defined phase boundary is achieved in this case.

In order to obtain a brew liquid that is enriched by value adding content substances and saturated with the value adding content substances that are to be transferred the prior art only adds a predetermined amount or saturation amount of the plant based content substance bearers per volume of fresh brew liquid, thus brew liquid that includes no value adding content substances or only small amounts of the value adding content substances in order to form the suspension.

The term "fresh brew liquid" defines a liquid that is used as a brew liquid in a method according to the invention wherein the fresh brew liquid has a concentration of at least one value adding content substance that is lower with respect to at least one of the content substances to be transferred, e.g. alpha acids in the hot portion or aroma substances in the cold portion, than a concentration of the value adding content substance in a residual suspension still contained in the dispersion and extraction container according to the method in claim 1 or according to the method according to claim 6 in the suspension to which the "fresh" brew liquid is added. The brew liquid can be e.g. water, beer or young beer when the method is performed in the cold portion and the brew liquid can be wort or added water when the method is performed in the hot portion.

During cold hopping the ratio is e.g. 1.5% to 2% of mass of hop solids in the suspension in order to obtain e.g. a complete transfer of linalool as an aromatic substance into the brew liquid. Beyond that percentage range a transfer rate of the aromatic substances from the plant based content substance bearers into the brew liquid drops significantly.

Accordingly it is not economical and not useful to add additional plant based content substance bearers to the suspension beyond a predetermined ratio of plant based content substance bearers to fresh brew liquid (saturation ratio), thus e.g. to produce a concentrate with larger amounts of hop. When a higher volume of content substance bearers is to be processed the volume of the fresh brew liquid needs to be increased as well which, however, means that a much larger volume of dispersion and extraction containers is required. For many breweries this is not possible due to space constraints and furthermore would increase equipment cost.

The method according to the invention facilitates to achieve the same result with a comparatively small dispersion and extraction container compared to a much larger prior art container. The predetermined amount according to the method according to the invention is significantly larger than the saturation amount. Thus, the method according to the invention provides an initial suspension before step a), wherein a ratio of plant based content substance bearers to fresh brew liquid is significantly above the "saturation concentration", thus an "over concentrated suspension" is provided. In case of cold hopping the ratio produced is at approximately 6% to 8.5% of mass hop solids in the initial suspension. Due to the high concentration gradient with respect to the content substances to be transferred between the fresh brew liquid and the plant based content substance bearers, e.g. plant based aroma bearers a quicker and more effective substance transfer of the value adding content substances, e.g. aroma substances into the brew liquid is provided.

Performing steps b) and c) according to the invention the amount of content substance bearers that remains in the dispersion and extraction container after step a) is subjected to a recurring "wash out" with fresh brew liquid. Since no value adding content substances or merely insignificant amounts of the value adding content substances are dissolved in the fresh brew liquid there is a high concentration gradient with respect to the content substances that are still included in the content substance bearers and that are still to be transferred and a quick and effective substance transfer of the value adding content substances into the brew liquid occurs.

In the method according to the invention according to claim 1 a batch wise thinning of the value adding content substances is performed that are included in the content substance bearer supply in the dispersion and extraction container. Thus, an equipment volume, thus equipment size can be significantly reduced over the prior art which facilitates equipping existing breweries at lower cost and in a simpler manner. Thus, the content substance bearer solids always remain in the dispersion and extraction container and are not carried into downstream brew arrangement components. The content substance bearer solids are thus immobilized and do not cause any problems in other pieces of process equipment and plant components in subsequence steps.

Additional advantageous features of this first embodiment of the method according to the invention are specified in dependent claims 2-5.

Advantageously the brew liquid that is enriched with the value adding content substances is extracted through a solid-liquid separator from the dispersion and extraction container in steps a) and c). This prevents that solid particles are carried into the conduit system and the containers of the brewing plant.

Alternatively a gravity precipitation step, e.g. a sedimentation step is performed before step a) and advantageously also before step c) wherein solids of the suspension form a sediment or float up in the dispersion and extraction container during a phase separation time period of advantageously 3-10 minutes. The enriched brew liquid can then be drained from an upper or lower portion of the dispersion and extraction container depending on the phase separation time. The ideal phase separation time is the time until a defined phase boundary is formed.

Advantageously the brew liquid that is enriched with the value adding content substances is drained from a volume of the cleared brew liquid that is enriched with the value adding content substances and formed in the dispersion and extraction container during gravity precipitation due to the phase separation in steps a) and c). This draining can be performed e.g. by a solid-liquid separator that includes sifting surfaces through outlet openings that are distributed over a height of the dispersion and extraction container or through at least one tubular arm that is arranged in the container and rotatable about a horizontal axis and configured curved or angled wherein an inlet opening of the tubular arm is arrangeable at different elevations in the container by pivoting the tubular arm.

The method according to the invention is particularly advantageous when the fresh brew liquid is water, wort, beer or young beer.

In order to increase efficiency steps b) and c) are performed several times, at least twice in sequence.

Advantageously the fresh brew liquid is water, wort, beer or young beer and water is used in the last step b) as fresh brew liquid. This does not only achieve a high concentration gradient but beer or young beer that may still be in the content substance bearer supply in the dispersion and extraction container is flushed out by the water which reduces the beer loss.

Alternatively the object is achieved by a method according to claim 6 for extracting value adding content substances from plant based content substance bearers into a brew liquid wherein a suspension including fresh brew liquid and plant based content substance bearers is generated, wherein the plant based content substance bearers are at least partially distributed or dissolved in the suspension so that the value adding content substances transfer from the plant based content substance bearers into the brew liquid, the method the comprising:

a') feeding the suspension to a solid-liquid separator.
b') introducing fresh brew liquid into the suspension flowing to the solid liquid separator;
c') separating the plant-based content substance bearers from the suspension in the solid-liquid separator;
d') draining the brew liquid enriched with the value adding content substances from the solid-liquid separator for further processing; and
e') removing the plant-based content substance bearers separated from the suspension in step c') from the solid liquid separator into a solid material collection container.

Contrary to the batch method according to claim 1, the batch method according to claim 6 is an inline method that also produces an over concentrated suspension initially. While the suspension is conducted to a solid-liquid separator fresh brew liquid is introduced into the suspension in step b') which increases a concentration gradient in the suspension with respect to the value adding content substances to be transferred between the diluted brew liquid in the suspension that is diluted by the introduction of the fresh brew liquid and the plant based content substance bearers that are included in the suspension. This increased concentration gradient improves the transfer of the value adding content substances into the brew liquid.

Additional advantageous features of the second variant of the method according to the invention are specified in dependent claims 7-10.

Advantageously suspension that is mixed in step b') with fresh brew liquid is run through a mixing and/or reaction device before it reaches the solid-liquid separator. This facilitates influencing a contact time period and/or the mixing between the brew liquid and the content substance bearers or value adding content substances, e.g. included in the suspension e.g. alpha acids in the hot portion. A change of the flow velocity can be used to change turbulence and thus improve the mix rate or change the contact time.

Increasing the contact time between the brew liquid and the content substance bearers included in the suspension further improves substance transfer. In case only one reaction device is provided the reaction device can be formed by a tubular conduit that forms a reaction path. A reaction path of this type can have a larger nominal tube diameter, thus a larger inner diameter than the preceding tubular conduits upstream and downstream of the reaction path. In the reaction path the flow velocity is reduced since the volume flow remains constant and dwelling time in this section is increased. Alternatively, the flow velocity can also be increased to achieve a higher level of turbulence e.g. by reducing the nominal tube diameter.

Also in this embodiment it is advantageous when the fresh brew liquid introduced in step b') is beer, young beer, wort or water.

When the fresh brew liquid introduced into the suspension in step b') is beer or young beer that is obtained from a storage tank for beer or young beer, the brew liquid enriched with value adding content substances that is drained from the solid-liquid separator in step d') is advantageously fed back into the storage tank.

In an advantageous embodiment of the alternative method the brew liquid that is enriched with the value adding content substances is drained from the solid-liquid separator in step d') is mixed with fresh brew liquid and then introduced into a storage container for aroma infused brew liquid.

An embodiment of the second method variant is particularly advantageous where a predetermined amount of plant based content substance bearers is brought in contact with a predetermined volume of fresh brew liquid in a dispersion container in order to produce the first suspension from the fresh brew liquid and the plant based content substance bearers and the plant based content substance bearers distribute or dissolve in the fresh brew liquid at least partially forming the first suspension.

The object is also achieved by an embodiment of a device with the features of patent claim 11.

The device for extracting value adding content substances from plant based content substance bearers into a brew liquid operates according to the method according to claim 1 and includes a dispersion and extraction container that includes a process cavity with an insertion opening for the plant based content substance bearers, an inlet for fresh brew liquid into the process cavity and an outlet for the brew liquid that is enriched by the value adding content substances and that is essentially without solids and an outlet for washed out plant based content substance bearers, characterized in that control devices are provide that are configured to control the steps of the method according to claim 1 to cause a draining of the brew liquid that is enriched with value adding contents substances from the dispersion and extraction container and thereafter to control an inflow of a predeterminable or predetermined volume of fresh brew liquid through a feed conduit and to control a draining of the brew liquid that is enriched with value adding content substances from the dispersion and extraction container after expiration of the pre-determined or predeterminable time period.

Thus, it is advantageous when the control devices include at least one control arrangement. The control arrangement facilitates optimized automated operations of the device.

Advantageously the arrangement includes a dispersion and extraction container that includes at least one solid-liquid separator that is arranged between the process cavity and the drain for the brew liquid that is enriched by value adding content substances.

This alternative device for extracting value adding content substances from plant based content substance bearers into a brew liquid according to a method according to claim 6 is provided with a transport conduit for a suspension including brew liquid and plant based image substance bearers that runs from a suspension source to a solid-liquid separator and that is characterized according to the invention in that a feed conduit for fresh brew liquid is provided that leads into the transport conduit. A solid-liquid separator according to the invention can include e.g. a decanter, a centrifuge, a curved sieve, filter candles or a sedimentation tank or can be formed thereby.

Thus, a mixing and/or reaction device is advantageously provided between the inlet of the feed conduit for fresh brew liquid into the transport conduit and the solid-liquid separator.

Also this alternative device for extracting content substances from plant based substance bearers into a brew liquid can include control devices or at least a control arrangement like in the first embodiment to facilitate optimum automated operations of the device.

The invention further relates to a brewing arrangement that includes one of the devices according to the invention for performing one of the methods according to the invention for cold hopping. Thus, a device of this type according to the invention is either integrated in a stationary manner into the cold portion of the brewing arrangement or it is configured as a mobile device that is connectable with one or plural brewing arrangements and implementable into their flow path of the brew liquid in the cold portion. Advantageously this is performed in the process flow direction behind the wort cooler or behind a fermentation tank, particularly advantageously in a brew liquid cycle in a storage basement where young beer is pumped from a storage tank through the device according to the invention and back into the storage tank or into another tank or to a downstream process, e.g. for filling, beer filtration or beer separation.

Alternatively, the device according to the invention can also be used in the hot portion of the brewing arrangement, thus upstream of the wort cooler in a mobile or stationary manner. Thus, the device according to the invention and the method according to the invention improve e.g. isomerization of alpha acids into iso alfa acids and thus improve bitter substance yield. Furthermore, the solids freight into the hot trub separator e.g. a whirlpool can be significantly reduced when the hop particles do not proceed into the actual sud process but are extracted and are precipitated in a bypass. Thus, the efficiency of the hot trub separator can be increased which can lead to reduced wort losses.

When performing the methods according to the invention in a brewing process, suitable additives can be added to the brew liquid or the suspension in order to positively influence a speed of the substance transfer or the solubility of the value adding content substances e.g. by changing a pH value or a polarity of the liquid. The brew liquid and/or the suspension can also be advantageously subjected to a thermal treatment which is advantageous, in particular, when using a device shown in FIGS. 4-7, thus during inline preparation of the suspension. Improved solubility of the value adding content substances due to increased temperature or due to additives requires fewer washing cycles or a shorter contact period, which causes less re-dilution. This reduces the entire process time.

The repeated wash extraction of the content substance bearers performed according to the method according to claim 1 and the re-dilution of the suspension performed according to the method according to the invention according to claim 6 increases the transfer rate of the value adding content substances into the brew liquid again. The term "transfer rate" defines a ratio of a mass of a value adding content substance that is transferred into the fluid divided by an initial mass of this content substance in the supply of content substance bearers. During a first respective content substance transfer from the content substance bearers into the brew liquid in the first suspension a concentration of the value adding content substances in the brew liquid increases over time until the transfer speed decreases due to the decreasing concentration gradient and a maximum soluble concentration is achieved. The remaining rest of the value adding content substance in the supply of the content substance bearers cannot enter the solution anymore due to the properties of the brew liquid. Thus, the transfer from the content substance bearer into the brew liquid is incomplete and value adding substances remain in the supply of the content substance bearers. During a repeated wash out of the content substance bearers according to the method according to claim 1 and during the re thinning of the suspension (method according to claim 6) the concentration difference is increased again so that existing non-dissolved value adding content substances can enter into solution.

Using the methods according to the invention, a smaller dispersion container can be used to provide the same volume of brew liquid with value adding content substances, thus provide with aroma from aroma substances without having to introduce the content substance bearers into the actual large volume tank in order to assure a sufficient transfer of the respective value adding content substance. Thus, the devices according to the invention can be implemented into a brewing arrangement in a very compact and space saving manner.

Tests by the inventor have shown that an initial suspension with 6.5% mass of hop pallets functioning as content substance bearers and a subsequent re thinning to 1.5% mass yields the same mass related transfer of the value adding content substance linalool into the brew liquid as a suspension that only includes 1.5% hop pallets by mass. The total amount of the transferred value adding content substance or the yield from this method is equal to introducing the aroma component into a larger tank with a lower mass concentration but equal amounts of aroma components that are available for the transfer. The aroma components do not have to be introduced into the actual large volume tank for this purpose.

Attempting to operate exclusively with a suspension with 6.5% mass, thus without re thinning only yields approximately a 50% transfer rate compared to the 1.5% mass suspension.

Tests with the method and devices according to the invention have shown that the initial dispersion and extraction time, thus the first predetermined time span is advantageously between 30 minutes and two hours, further advantageously between one hour and two hours. Advantageously the mass concentration of the content substance bears, e.g. hot pellets of the first suspension is 6-8 mass % further advantageously 6.5-7 mass %, and particularly advantageously 6.5 mass %.

Performing the method according to claim 6 it has become evident that re thinning the first suspension by introducing the fresh brew liquid into the first suspension flow that runs in the transport conduit 60 leads to an optimum linalool yield when the thinning ratio with reference to the mass concentration of the content substance bearers (hop pellets) in the first suspension is 1:3 to 1:5.

BRIEF DESCRIPTION OF THE DRAWINGS

Advantageous embodiment of the invention with additional design features and further advantages are now described with reference to appended drawing figures, wherein.

DETAILED DESCRIPTION OF THE INVENTION

Figure 1:
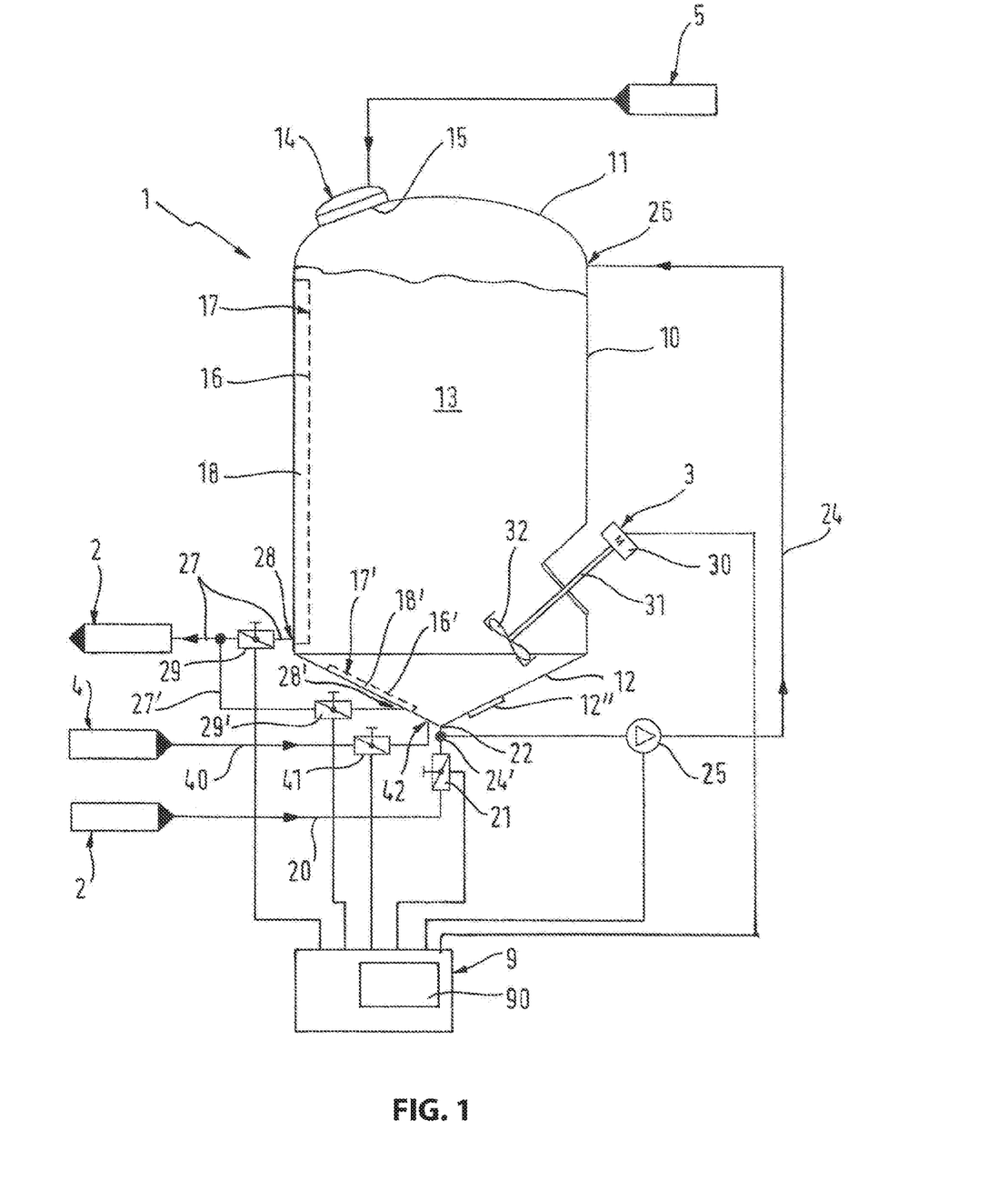
FIG. 1 illustrates a schematic representation of a first device according to the invention to perform a first method according to the invention.

FIG. 1 illustrates a first embodiment of a device according to the invention for extracting value adding content substances, in beer production e.g. bitter substances, etheric oils as aroma bearers or polyphenols from plant based content substance bearers into a brew liquid according to a first embodiment of the first method according to the invention.

The device includes a dispersion and extraction container 1 that is illustrated in a partial sectional view that is configured as a vessel with a cylindrical circumferential wall 10, a dome shaped upper ceiling wall 11 and a cone shaped container base 12 that jointly envelop a process cavity 13 in an interior of the dispersion and extraction container 1. The dome shaped upper ceiling wall 11 that is permanently connected with the cylindrical wall 10 e.g. by a weld includes a filling opening 15 for plant based content substance bearers, e.g. hop or hop pellets that is closeable by a cover 14. When the cover 14 is open the plant based content substance bearers can be filled into the process cavity 13 from a content substance bearer supply 5 through the opening 15 wherein the plant based substance bearers form a suspension together with a brew liquid in the process cavity as will be described infra. The container base 12 includes an outlet 12" for removing solids.

A feed conduit 20 that comes from a storage tank 2 for fresh brew liquid and that includes a cut off valve 21 is connected with a fluid connection 22 at a lowest point of the cone shaped container base 12 and connected with a recirculation conduit 24 downstream of the cut off valve 21. The recirculation conduit 24 includes a recirculation pump 25 that is configured to improve the dispersion process by recirculating the suspension. The recirculation conduit 24 opens into the upper portion of the cylindrical wall 10 of the dispersion and extraction container 1 and forms an inlet 26 into the process cavity 13. The cut off valve 21 is arranged in the inlet conduit 20 between the storage container 2 and the branch 24' of the recirculation conduit 24. Closing the cut off valve 21 facilitates recirculating the suspension including brew liquid and plant based content substance bearers included in the process cavity 13 using the recirculation conduit 24 and the pump 25 included therein. Thus, the suspension exits the process cavity 13 through the flow connection 22 at the lowest spot of the cone shaped container base 12 and is fed back into the process cavity 13 through the inlet 26.

A sieve device 16 is arranged in an interior of the dispersion and extraction container 1 between the process cavity 13 and the cylindrical circumferential wall 10 of the dispersion and extraction container 1 at least in a portion of the cylindrical and circumferential wall 10 wherein the sieve device forms an upper solid-liquid separation device 17 and separates an upper filtrate collection cavity 18 from the process cavity 13. A drain conduit 27 runs into the upper filtrate collection cavity 18 and forms an upper outlet 28 for the filtrate, thus for the brew liquid that is enriched with value adding content substances. The drain conduit 27 that also includes a cut off valve 29 leads into the storage tank 2 as illustrated in FIG. 1.

Another sieve device 16' is arranged in the cone shape base 12 and separates a lower filtrate collection cavity 18' from the process cavity 13. Also this lower sieve device 16' forms a lower solid-liquid separation device 17'. From this lower filtrate collection cavity 16' a lower drain conduit 27' leads to the drain conduit 27 and thus forms a lower outlet 28' for the filtrate. A cut off valve 29' is also provided in the lower drain conduit 27'.

A stirring device 3 with a stirring drive 30, a stirring shaft 31 and a stirring propeller 32 at a free end of the stirring shaft 31 that runs into the process cavity 13 is provided in a lower portion of the dispersion and extraction container 1. The stirring device 3 forms a dispersion and homogenization device for the suspension arranged in the process cavity 13.

FIG. 1 furthermore shows an inert gas conduit 40 that leads from an insert gas storage device 4 to an inert gas inlet 42 provided in the cone shaped container base 12. A cut off valve 41 is also provided in the inert gas conduit 40.

An alternative embodiment of the device described supra is illustrated in FIG. 1 wherein the same reference numerals used in FIG. 1 designate the same components.

Figure 2:
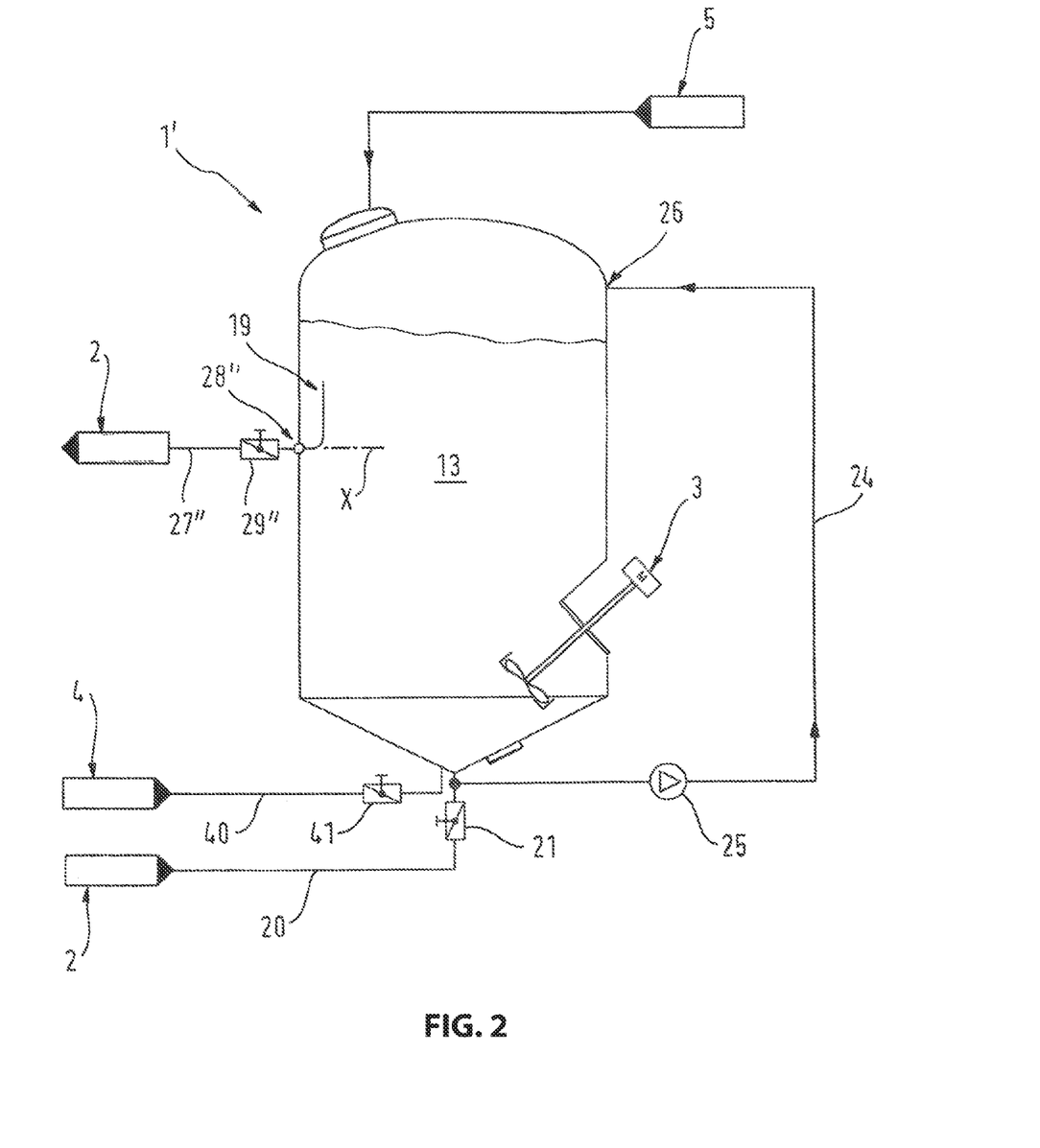
FIG. 2 illustrates a schematic representation of a second device according to the invention for performing a second embodiment of the first method according to the invention.

The dispersion and extraction container 1' illustrated in FIG. 2 has the same basic configuration as the dispersion and extraction container 1 illustrated in FIG. 1, however the sieve devices of the dispersion and extraction container of FIG. 1 that separate a respective filtrate collection cavity from the process cavity 13 are missing. Instead the dispersion and extraction container 1' of FIG. 2 is provided with a drain for the brew liquid that is enriched with the value adding content substances, e.g. the aroma enriched brew liquid wherein the dispersion and extraction container 1' includes a tubular arm 19 that is arranged in the process cavity 13 and rotatable about a horizontal axis X and forms an outlet 28" for the brew liquid enriched with the value adding substances while being connected through a cut off valve 29" with the drain conduit 27" arranged outside of the dispersion and extraction container 1. The position of the tubular arm is to be selected so that a liquid phase with different suspension concentrations can be drained, namely with different sediment levels due to different solid properties or mass concentrations. As an alternative to the rotatable tubular arm several container outlets can be provided at different elevations.

Figure 3:
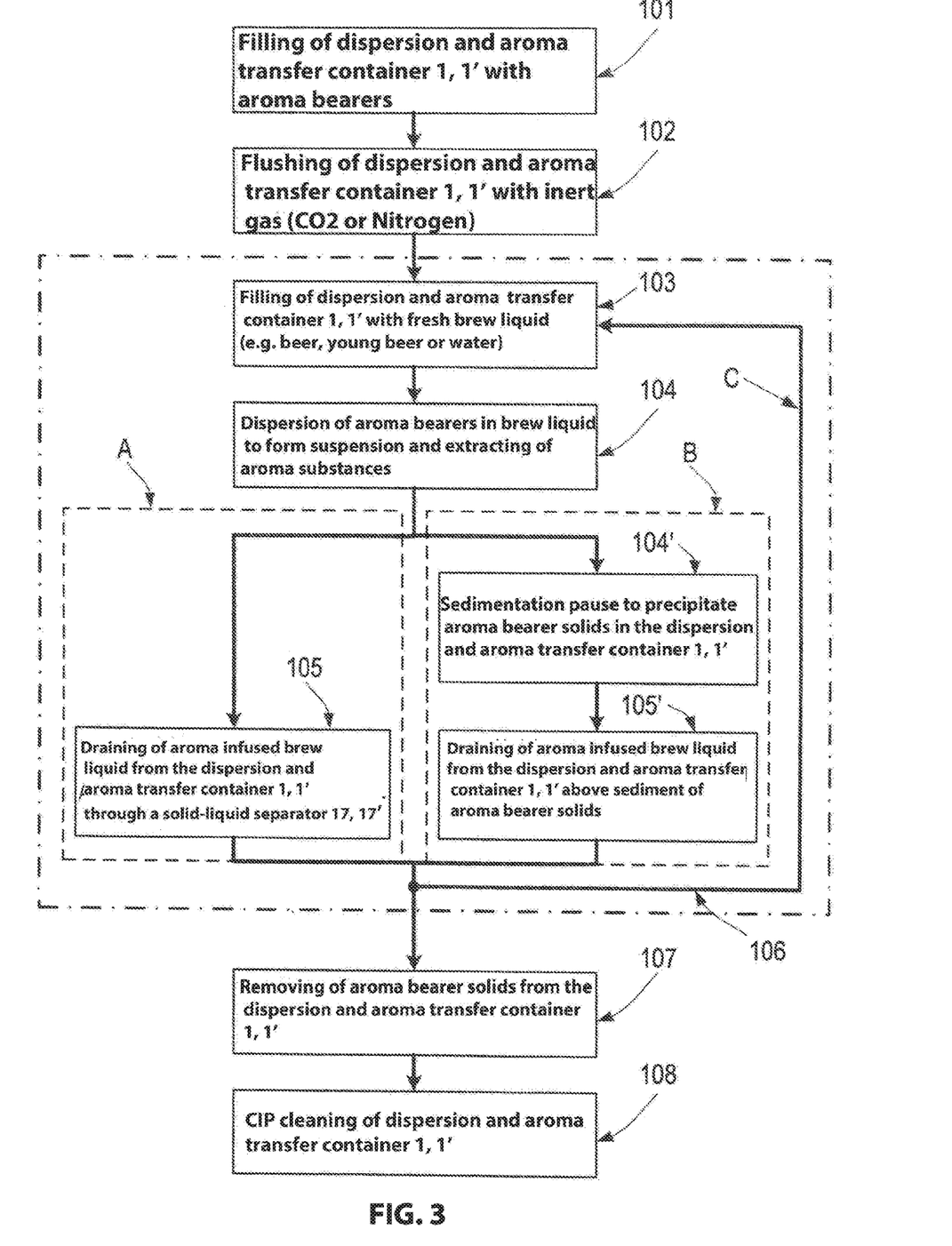
FIG. 3 illustrates a flow chart of the first method according to the invention.

FIG. 3 illustrates a flow chart of the first embodiment of the method according to the invention, wherein the dash dotted line defines the actual core of the method according to the invention. The dashed lines respectively envelop a variant of the first embodiment of the method according to the invention.

Initially the dispersion and extraction container 1 or 1' is filled with a predetermined amount of plant based content substance bearers from the content substance bearer supply 5 through the filling opening 15 with the cover 14 open in a first preparation step 101. Thereafter, the dispersion and extraction container 1, 1" filled with a pre-determined amount of the plant based content substance bearers is purged with an inert gas e.g. $CO_2$ or $N_2$ in a subsequent next step 102. Thus, the inert gas is conducted from the inert gas storage container through the inert gas conduit 40 and the inert gas inset 42 from below into the process cavity 13. Thus, the insert gas drives air from the process cavity 13 e.g. through the filling opening 15 so that an inert gas atmosphere that is free from oxygen is formed in the process cavity 13 that prevents an oxidation of the content substance bearers. Thus, the fill in opening 15 is closed gas tight by the cover 14.

Thereafter, the dispersion and extraction container 1, 1' is filled with brew liquid, e.g. beer, young beer or water in a subsequent step 103. Thus, the brew liquid from the storage container 2 is introduced in the process cavity 13 through the open cut off valve 21, the conduit 20 and the fluid connection 22 provided in the container base 12. This way the predetermined amount of plant based content substance bearers in the process cavity 13 of the dispersion and extraction container 1 or 1' is brought into contact with the pre-determined volume of fresh brew liquid. Fresh brew liquid in this context is a brew liquid, e.g. beer or young beer or water which has not been in intense contact with the plant based content substance bearers or which does not include any of the content substances to be transferred or merely an insignificant amount thereof.

The stirring propeller 32 of the stirring device 3 produces a first suspension of the fresh brew liquid and the plant based content substance bearers exclusively in step 104 in the process cavity 13 wherein the plant based content substance bearers are evenly distributed and dissolved in the brew liquid. Instead of the stirring device 3 of the dispersion container 1, 1' or in addition thereto also the recirculation conduit 24 can be provided with a recirculation pump 25 for the suspension which generates an optimum mixing of brew liquid and content substance bearers not by stirring but by recirculation.

A first variant A of the first alternative of the method according to the invention shown in FIG. 3 uses the device according to FIG. 1. After a predetermined stirring or recirculation time period the stirring device 3 and the recirculation pump 25 are stopped and gravity precipitation is started in the suspension so that a phase boundary is quickly formed between the solids of the plant based content substance bearers included in the suspension and the clear brew liquid. The solids sediment or float up and the outlet 28 can already be opened during this time period. This means the cleared brew liquid can already flow through the lateral sieve surface 16 through the outlet 28 in the portion of the cleared brew liquid that has separated in the dispersion container while the solids sediment or float up and thus clog or block the sieve surface in this location. Draining the cleared brew liquid through the solid-liquid separation device 17, 17' can also be performed during stirring or recirculating. The filtrate that collects in the upper filtrate collection cavity 18 and in the lower filtrate collection cavity 18' downstream of the respective solid-liquid separation device 17, 17', thus the brew liquid that is enriched with the value adding content substances from the content substance bearers e.g. aroma enriched and from which the solid particles have been purged by the sieve devices 16, 16' is drained through the respective outlet 28, 28' and through the drain conduit 27, 27' in step 105 after step 104 and thereafter fed back into the storage container 2 or another storage container. This step 105 corresponds to the method step a) in claim 1.

In a second variant B of the first alternative of the method according to the invention that is illustrated in FIG. 3 and that is performed by the device illustrated in FIG. 2, the stirring device 3 is turned off after the step 104 in which the content substance bearers are dispersed by the stirring device 3 and the value adding substances are extracted from the content substance bearers and an explicit sedimentation pause is inserted for a predetermined pause period so that the solids included in the suspension in the process cavity 13 can participate in a downward direction (step 104'). After an end of the sedimentation pause the brew liquid that collects in the upper portion of the process cavity 13 and that is cleared and enriched with the value adding content substances is drained through the tubular arm 19 and conducted through the fluid connection outlet 28' into the drain conduit 27 and through the drain conduit 27 back into the storage container 2 or to another storage container (step 105'). Also this step 105' corresponds to the method step a) in claim 1.

After the enriched brew liquid has been drained from the process cavity 13 in step 105 or 105' the method goes back to step 103 in step 106 which is indicated by the return arrow C. Thereafter the steps 103, 104 and 105 (variant A) or 103, 104, 104', 105' are performed again in variant B. The repetition of the method steps indicated by the return arrow C can be performed once or several times as long as a worthwhile amount of value adding content substances is still included in the plant based content substance bearers included in the process cavity 13 in order to cause an effective content substance transition from the plant based content substance bearers into the newly added fresh brew liquid.

Thus, the brew liquid that is enriched with the value adding content substances in steps 103 and 104 is drained after a first predetermined time period from the dispersion and extraction container 1, wherein the plant based content substance bearers remain in the dispersion and extraction container 1 (method step a of claim 1). Thereafter the fresh brew liquid is fed into the dispersion and extraction container in step 103 and a second suspension is generated in step 104, i.e. method step b of claim 1. After an additional predetermined time period included in step 104 and in which the content substance transition occurs from the plant based content substance bearers into the brew liquid, the brew liquid that is enriched with the value adding content substances is drained in step 105 or 105' from the dispersion and extraction container 1, wherein the plant based content substance bearers remain in the dispersion and extraction container also in this method step c of claim 1.

Advantageously the last step recurring step 103 of feeding additional fresh brew liquid into the dispersion and extraction container 1 uses water as brew liquid in order to flush beer or young beer that is still included in the plant based content substance bearers remaining the process cavity 13 and thus improves the beer yield.

After the last recursive execution of the method steps 103, 104, 105 or 103, 104, 104' and 105' the solids, thus the washed out plant based content substance bearers are transported out of the dispersion and extraction container, 1' through an extraction opening in step 107. In the subsequent step 108 a CIF cleaning of the dispersion and extraction container 1, 1' is performed.

In order to perform the method the cutoff valves 21, 29, 29' or 29" and advantageously the cutoff valve 41 form control devices configured to control the method steps. The cutoff valves are controlled so that the method steps are performed in the correct sequence and with the correct time intervals there between. Also the pump 25 and the stirring device 3 can be included into the control and respectively form an additional control device. Even when the recited control devices are manually switchable it is advantageous to provide a control arrangement 9 that includes e.g., a control computer 90 and that is configured to put out control commands to the control devices to perform the respective method according to a computer program. A control arrangement of this type is illustrated in an exemplary manner in FIG. 1, however it can also be provided in the embodiments that are shown in the other figures.

Figure 4:
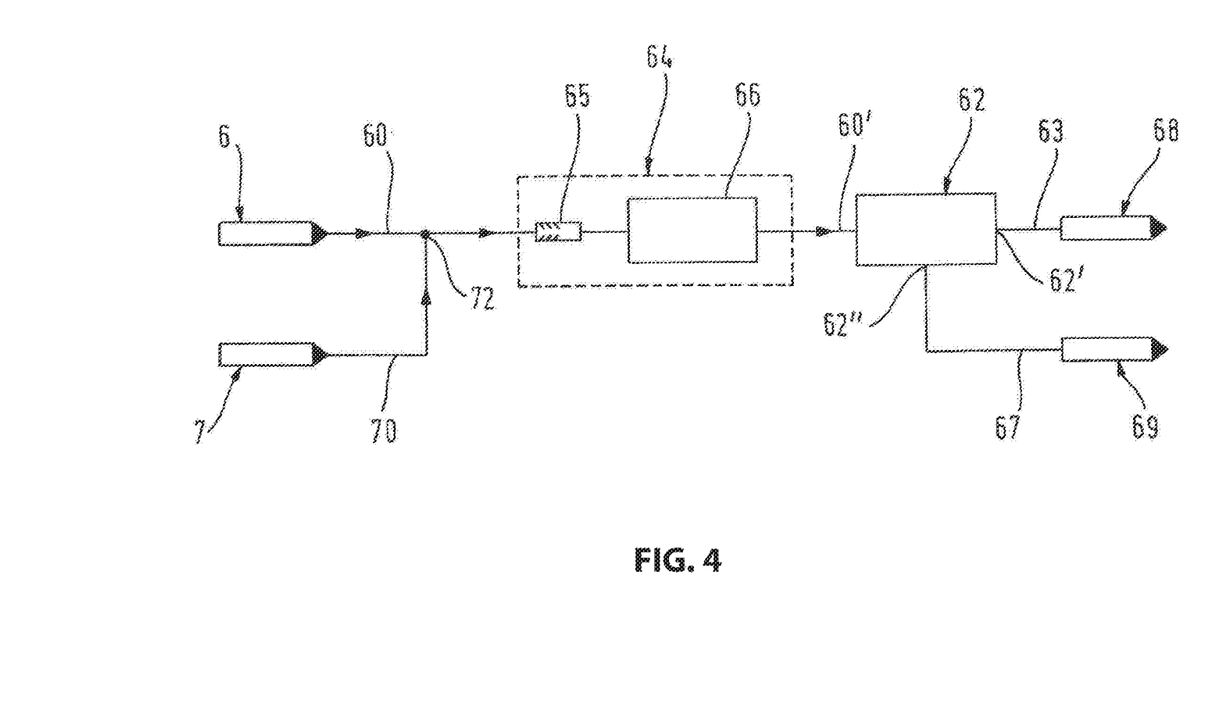
FIG. 4 illustrates a schematic representation of a third device according to the invention for performing the second method according to the invention.

FIG. 4 illustrates a configuration of a third variant of the device according to the invention where no batch enrichment of a brew liquid with value adding content substances is performed like in the embodiments according to FIGS. 1 and 2 but an inline enrichment. Thus, a highly concentrated suspension from a brew liquid and content substance bearers dispersed therein is conducted from a storage container illustrated in FIG. 6 for the suspension supply through a transport conduit 60 to a solid-liquid separator 62. Fresh brew liquid is introduced into the suspension stream that is transported in the transport conduit 60 from a brew liquid storage container 7 through a brew liquid feed conduit 70 that leads into the transport conduit 60. The substance flows through the transport conduit 60 and the brew liquid feed conduit 70 are advantageously adjustable relative to each other by control or regulation valves in order to obtain a defined mixing ratio. Also the control or regulation valves are advantageously controlled or regulated by the control computer 90 of the control device 9 in order to perform the steps of the respective method according to the invention.

The embodiment according to FIG. 4 includes a mixing and/or reaction device 64 in the transport conduit 60 downstream of the flow in point of the brew liquid feed conduit 70. The mixing and/or reaction device 64 includes viewed in flow direction initially a static mixer 65 and downstream thereof a reaction path 66 that is formed e.g. by a tubular arrangement. An end section 60' of the transport conduit 60 runs from the reaction path 66 to the solid-liquid separator 62. The solid-liquid separator 62 includes a first outlet 62' for a filtrate that is cleared from solids and an outlet 62" for the solids. A drain conduit 63 of the solid-liquid separator 62 runs from the first outlet 62' of the liquid-solid separator 62 to a storage container 68 for the filtrate, thus for the brew liquid that is enriched by the value adding content substances. The solid outlet 62" of the liquid-solid separator 62 is connected through a solids extraction conduit 67 with a solids collection container 69.

The diluted substrate flow that is generated in the area of the inlet 72 of the brew liquid conduit 70 into the transport conduit 60 is conducted to the liquid-solid separator 62 in methods step a' of claim 3 where the solids of the plant based content substance bearers are precipitated from the suspension in method step c' of claim 6. Fresh brew liquid is introduced into the suspension flow that runs in the transport conduit 60 on this transport path in method step b' of claim 6.

In order to have sufficient time available for transporting the content substances from the content substance bearers into the brew liquid an optional mixing and/or reaction device 64 is provided in the embodiment of FIG. 4. The diluted suspension is initially conducted through the static mixer 65 in order to achieve an optimal mixing of the plant based content substance bearers with the fresh brew liquids that is added to the suspension flow. The new essentially homogenous suspension generated in the static mixer 65 then flows through the reaction path 66 during a sufficient dwelling time that provides optimum substance transmission of the value adding substances from the content substance bearers into the brew liquid.

The downstream solid-liquid separator 62 subsequently separates the plant based content substance bearers from the suspension in method step c' of claim 6 and drains the brew liquid that is enriched with the value adding content substances from the device in method step d' of claim 6 and feeds it into the storage container 68 for the enriched brew liquid.

Figure 5:
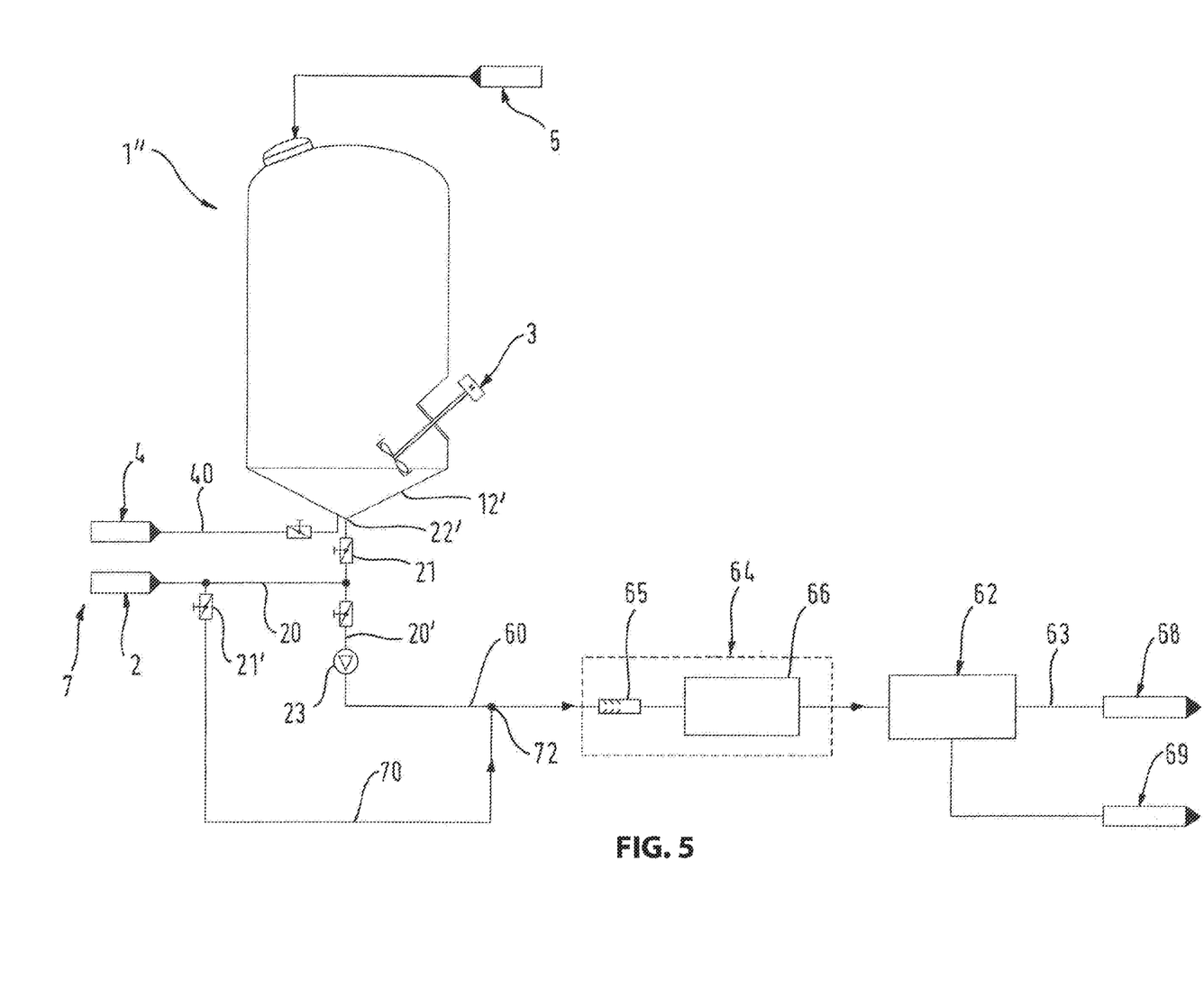
FIG. 5 illustrates a schematic representation of the third device according to the invention for performing the second method according to the invention with a dispersion container.

FIG. 5 illustrates the device of FIG. 4 with a dispersion container 1' where the highly concentrated suspension is generated which is conducted through the transport conduit 60 to the inlet 72 of the brew liquid conduit 60. Thus the dispersion container 1" forms the storage container 6 for the highly concentrated suspension. The configuration of the dispersion container 1" essentially corresponds to the configuration of the dispersion and extraction container described with reference to FIG. 2, however the dispersion container 1" lacks the tubular arm 19 and the outlet 28". A dispersion made from content substance bearers and fresh brew liquid is produced by the stirring device 3 in the dispersion container 1" as described with reference to FIG. 3 in steps 101-104, wherein a small amount of the value adding content substances is already extracted from the plant based content substance bearers into the brew liquid. Instead of the stirring device 3 of the dispersion container 1" illustrated in FIG. 5 or as an addition thereto a recirculation conduit with a recirculation pump for the suspension can be provided which achieves an optimal mixing of brew liquid and content substance bearers not by stirring but by recirculating.

The lower fluid connection 22' in the portion of the lower point of the cone shaped container floor 12' of the dispersion container 1" is used for filling the dispersion container 1" with fresh brew liquid from the brew liquid supply 2 as described with reference to FIGS. 1 and 2 and simultaneously the fluid connection 22' forms and outlet for the suspension generated in the dispersion container 1". Thus, the fluid connection 22' is connected through a drain conduit 20' that includes a substrate feed pump 23 with the feed conduit 60. The brew liquid feed conduit 70 is connected through a cutoff valve 21' with the feed conduit 20 for the fresh brew liquid.

The method that can be performed by the device according to FIG. 5 corresponds to the method that has described with reference to FIG. 4. Thus, the method includes feeding the suspension to the solid-liquid separator 62 according to method step a' in claim 6, introducing fresh brew liquid at the inlet 72 into the suspension on its path to the solid-liquid separator according to method step b' in claim 6, separating the plant based content substance bearers from the suspension in the solid-liquid separator 62 according to method step c' in claim 6 and draining the brew liquid that is enriched with the value adding content substances from the solid-liquid separator 62 through the drain conduit 63 for further processing according to method step d' in claim 6.

Figure 6:
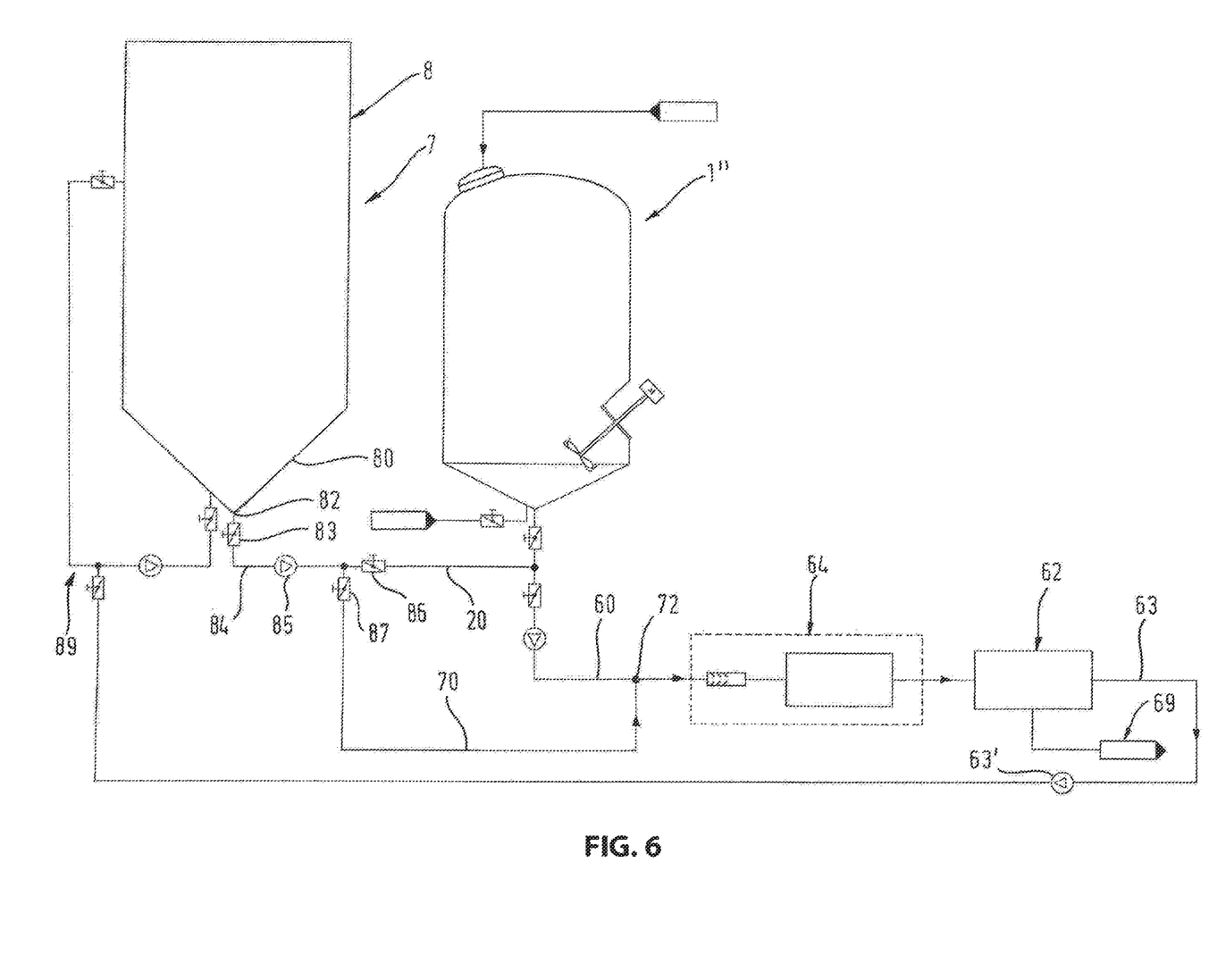
FIG. 6 illustrates a schematic representation of the third device according to the invention according to FIG. 5 integrated into a beer cycle in a storage portion of a brewing arrangement.

FIG. 6 illustrates the device described with reference to FIG. 5 integrated into a cold portion of a brewing arrangement. A storage tank 8 for beer or young beer forms the storage container 7 for the fresh brew liquid that is not yet enriched by the value adding content substances, thus in the illustrated embodiment for the beer or young beer. The storage tank 8 includes a cone shaped container base 80 that includes an outlet 82 for the fresh brew liquid at a lower tip of the cone shaped container base. A brew liquid conduit 84 that is blockable by a valve 83 is connected to the outlet 82 wherein a feed pump 85 is provided in the brew liquid conduit 84 and wherein the brew liquid conduit 84 leads into the feed conduit 20 for the fresh brew liquid downstream of an additional cutoff valve 86. The brew liquid feed conduit 70 for the fresh brew liquid branches off from the brew liquid conduit 84 upstream of the additional cutoff valve 86 and is also blockable by a cutoff valve 87.

The drain conduit 63 for the filtrate drained from the solid-liquid separator 62, thus for the brew liquid that is enriched by the value adding content substances, e.g. the aroma enriched brew liquid forms a recirculation conduit in the embodiment of FIG. 6 that is provided with a feed pump 63' wherein the recirculation conduit leads to a recirculation circuit 89 of the storage tank 8 so that the brew liquid that is enriched with the value adding content substances is run back into the storage tank 7 where it is mixed with the fresh brew liquid still included therein. This mixing reduces the concentration of the value adding content substances in the brew liquid significantly so that the brew liquid that is included in the storage tank 8 and fed through the brew liquid conduit 84 can still be designated as fresh brew liquid since its concentration of the value adding content substances relative to the concentration in the content substance bearers relative to the suspension formed in the dispersion container 1 is negligibly low so that a concentration gradient of the value adding content substances with respect to the fresh brew liquid exists that suffices for an effective transfer of the value adding content substances.

Figure 7:
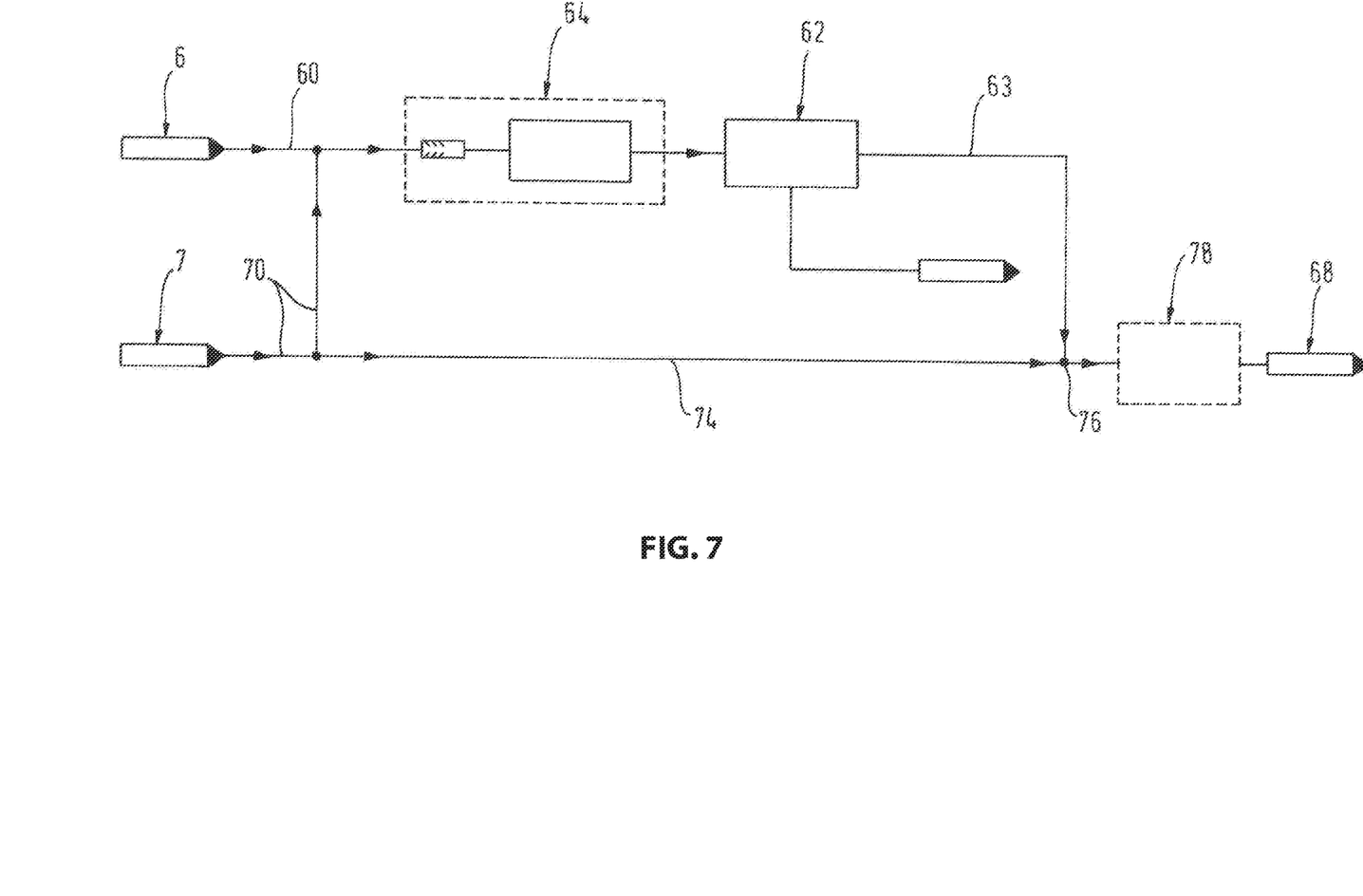
FIG. 7 illustrates a schematic representation of an embodiment of the third device according to the invention for performing the second method according to the invention.

FIG. 7 illustrates a variant of the device according to the invention for extracting value adding content substances from the plant based content substance bearers into a brew liquid described with reference to FIG. 4 that is also configured to perform the second variant of the method as described in claim 6. The basic configuration of the device of FIG. 7 corresponds to the device of FIG. 4, however the brew liquid feed conduit 70 for the fresh brew liquid is connected with the drain conduit 63 by a brew liquid transport conduit 64. At the inlet 76 of the drain conduit 63 into the brew liquid transport conduit 74 the incoming fresh brew liquid in the brew liquid transport conduit 74 is mixed with the aroma enriched brew liquid flowing through the drain conduit 63, thus with the brew liquid that is enriched by the value adding content substances. In order to achieve a very homogenous mixing a mixing device 78 can be provided downstream of the inlet 76 wherein the brew liquid is run through the mixing device into the storage container 68 for the aroma enriched brew liquid.

Reference numerals in the description and the drawings do not limit the scope and spirit of the invention which is defined exclusively by the appended patent claims.

REFERENCE NUMERALS AND DESIGNATIONS 1 dispersion and extraction container
1' dispersion and extraction container
1" dispersion container
2 storage device
3 stirring device
4 inert gas storage container
5 content substance bearer supply
6 storage container for suspension supply
7 brew liquid storage container
8 storage tank
9 control arrangement
10 cylindrical circumferential wall
11 dome shaped top wall
12 cone shaped base
12' cone shaped container floor
12" outlet
13 process cavity
14 cover
15 filling opening
16 sieve device
16' lower sieve device
17 upper solid-liquid separator
17' lower solid-liquid separator
18 upper filtrate collection cavity
18' lower filtrate collection cavity
19 tubular arm
20 feed conduit
20' drain conduit
21 cut off valve
21' cut off valve
22 fluid connection
22' fluid connection
23 substrate feed pump
24 recirculation conduit
24' branch off
25 recirculation pump
26 inlet into process cavity 13
27 drain conduit
27' lower drain conduit
27" drain conduit
28 outlet
28' outlet
28" fluid connection outlet
29 cutoff valve
29' cutoff valve
30 stir drive
31 stir shaft
32 stir propeller
40 inert gas conduit
41 cutoff valve
42 inert gas inlet
60 transport conduit
60' end section of transport conduit 60
62 solid-liquid separator
62' first outlet
62" solids outlet
63 drain conduit
63' feed pump
64 mixing and/or reaction device
65 static mixer
66 reaction path
67 solids extraction conduit
68 storage container
69 solids collection container
70 brew liquid feed conduit
72 inlet
73 feed pump
74 brew liquid transport conduit
76 inlet of drain conduit 63
76' cutoff valve
78 mixing arrangement
80 cone shaped container base
82 outlet
83 valve
84 brew liquid conduit
85 feed pump
86 cutoff valve
87 valve
89 recirculation loop
90 control computer
101 method step
103 method step
104 method step
104' method step
105 method step
105' method step
A first variant
B second variant
C recirculation arrow
X rotation axis of 19

What is claimed is:

1. A method for extracting value adding content substances from plant-based content substance bearers into a brew liquid, the method comprising:
   generating a suspension including fresh brew liquid selected from the group consisting of wort, beer, water and young beer and the plant-based content substance bearers selected from the group consisting of hop, solid hop materials, shells of citrus fruits and coffee;
   at least partially distributing or dissolving the plant-based content substance bearers in the suspension so that the value adding content substances transfer from the plant-based content substance bearers into the brew liquid; thereafter
   a') feeding the suspension through a transport conduit:
   b') introducing fresh brew liquid with a concentration of the value adding content substances that is lower than a concentration of the value adding content substances in the suspension into the suspension that flows in the transport conduit to form a diluted suspension in the transport conduit and introducing the diluted suspension into a solid-liquid separator;
   c') separating the plant-based content substance bearers from the diluted suspension in the solid-liquid separator;

d') draining the brew liquid infused with the value adding content substances from the solid-liquid separator for further processing; and e') removing the plant-based content substance bearers separated from the diluted suspension in step c') from the solid-liquid separator into a solid material collection container.

2. The method according to claim 1, wherein the suspension that is mixed in step b') with the fresh brew liquid is run through a mixing or reaction device to form the diluted suspension which flows into the solid-liquid separator.

3. The method according to claim 2,
wherein the fresh brew liquid introduced into the suspension in step b') is beer or young beer that is drawn from a storage tank for beer or young beer, and
wherein the brew liquid drained in step d') from the solid-liquid separator and infused with the value adding content substances is run back into a storage tank.

4. The method according to claim 1, wherein the brew liquid that is infused with the value adding content substances and drained in step d') from the solid-liquid separator is mixed with fresh brew liquid and then conducted into a storage container for aroma infused brew liquid.

5. The method according to claim 1,
wherein a predetermined amount of the plant-based content substance bearers is brought in contact with a predetermined volume of fresh brew liquid in the dispersion container 1" to produce the suspension from the fresh brew liquid and the plant-based content substance bearers, and wherein the plant-based content substance bearers are at least partially distributed or dissolved in the fresh brew liquid to form the suspension.

6. The method according to claim 1, wherein the extracting of the value-adding content substances from the plant-based content substance bearers into the brew liquid is performed in a cold zone of a brewing plant.

7. The method according to claim 6, wherein the plant-based content substance bearers include hops or hop products.

8. The method according to claim 1, wherein the value-adding content substances include bitter substances, or alpha acids or beta acids or linalool, or aromatic substances, or essential oils, or polyphenols.

9. The method according to claim 1, wherein the diluted suspension moves along a reaction path in step b' and absorbs additional value-adding content substances from the plant-based content substance bearers.

10. The method according to claim 9, wherein a flow velocity of the diluted suspension is reduced by a reaction path conduit having a larger diameter than a upstream conduit which increases a dwelling time of the diluted suspension in the reaction path and increases a transfer of the value adding content substances into the diluted suspension.

11. The method according to claim 7, wherein a concentration of the hop or hop products in the suspension is 6% to 8.5% by mass and a concentration of the hop or hop products in the diluted suspension is 1.5% to 2% by mass.

\* \* \* \* \*